(No Model.)
J. P. FARRELL.
GEAR CONNECTION FOR PLATFORM SPRINGS.
No. 501,411. Patented July 11, 1893.
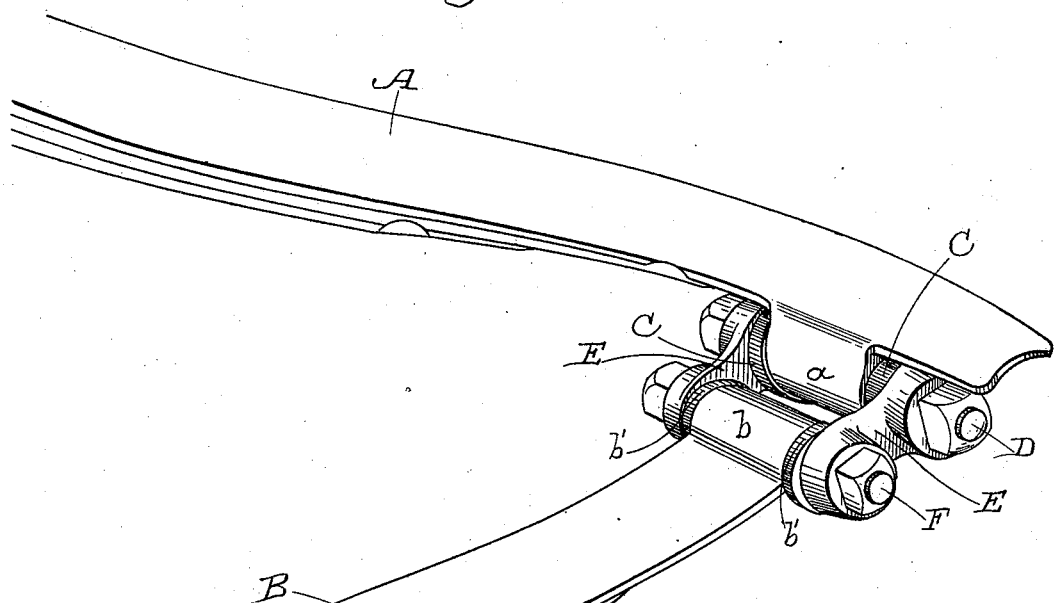
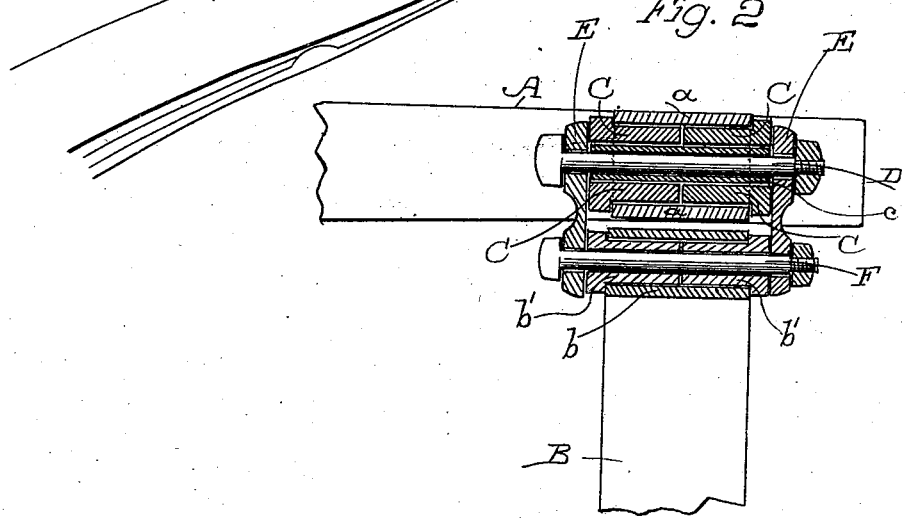
Witnesses,
Inventor,
Joseph P. Farrell
By Dewey & Co
attys

UNITED STATES PATENT OFFICE.

JOSEPH P. FARRELL, OF SAN FRANCISCO, CALIFORNIA, ASSIGNOR TO O'BRIEN & SONS, OF SAME PLACE.

GEAR CONNECTION FOR PLATFORM-SPRINGS.

SPECIFICATION forming part of Letters Patent No. 501,411, dated July 11, 1893.

Application filed April 3, 1893. Serial No. 468,893. (No model.)

*To all whom it may concern:*

Be it known that I, JOSEPH PATRICK FARRELL, a citizen of the United States, residing in the city and county of San Francisco, State of California, have invented an Improvement in Platform-Spring Gear Connections; and I hereby declare the following to be a full, clear, and exact description of the same.

My invention relates to that class of spring gears for vehicles in which the springs are of the platform pattern and their adjacent ends are united by means of shackles.

My invention consists in the novel construction of the ends of the springs, and in conjunction therewith of the novel shackle connection which I shall hereinafter fully describe, and specifically claim.

The object of my invention is to make an easy riding spring which will not snap or break like a rigidly connected spring, and which will neither work loose, nor rattle, nor wear out.

Referring to the accompanying drawings for a more complete explanation of my invention,—Figure 1 is a perspective view of my connection. Fig. 2 is a horizontal section, the connection being turned upside down.

The invention is particularly applicable to the platform springs for buggies. It is unnecessary herein to show four springs which constitute the platform, as my invention relates simply to the connection between their ends; consequently, I have shown one spring A, and the second spring B, the adjacent ends of which are to be connected. The spring A may be regarded as the end spring, and the spring B as the side spring, though this is immaterial, as the particular construction of the end of the spring may be upon one or the other, as may be desired.

The end of one of the springs, here shown as A, is provided with an eye $a$ extending downwardly from its under side, and having its aperture in line with the length of the spring. In practical construction this eye will be forged integrally with the spring. In this eye are fitted the rubber bushings C, one from each side, said bushings having a central sleeve $c$ which receives the bolt D, upon the ends of which are journaled the side pieces E having extending between their outer ends the bolt F and forming the shackle. The bolt D, when set up by its nut, presses the side pieces E of the shackle tightly against the rubber bushings, thereby holding all the parts in place, preventing all rattling, and forming a cushion which will avoid the danger of snapping and breaking. At the same time, the connection is loose enough to form the necessary shackle connection.

The end of the spring B is here shown as provided with an eye $b$ transversely of its end in usual manner, and it may be provided or not with a rubber cushion $b'$, and this eye is fitted upon the outer bolt F of the shackle. The formation of the eye $a$ integral with the end of the spring avoids the disadvantages of that construction, in which a separate eye piece is bolted or riveted to the spring, as such an eye piece is liable to work loose. Moreover it is common to secure the riveted eye piece to the upper side of the spring end, and to pass the adjacent end of the spring to be connected with it up behind and over it to reach the eye. This produces strain and gives rigidity of connection which is undesirable; but by having my eye under the end of the spring, and especially by forging with the spring, these disadvantages are overcome, and a connection is made which is easy, will not snap or break like a rigidly connected spring, and will not get loose, nor rattle, nor wear out.

These springs are practically unbreakable, as the connections push apart, allowing the axle to always stand on a true level, thus making an easy running buggy.

Having thus described my invention, what I claim as new, and desire to secure by Letters Patent, is—

A connection for the springs of a vehicle platform-gear consisting of an eye piece forged integral with the under side of the end of a spring, rubber bushings fitted in said eye piece and having a central sleeve, the side pieces of a shackle adapted to bear upon the outer ends of the bushings, a bolt passing through said side pieces and the inner sleeve of the bushings, a second spring having an eye piece upon its end transversely of the length thereof, and the securing bolt and bushing for securing the second spring to the side pieces of the shackle, as herein described.

In witness whereof I have hereunto set my hand.

JOSEPH P. FARRELL.

Witnesses:
S. H. NOURSE,
GEO. H. STRONG.